US009046269B2

(12) United States Patent
Smith et al.

(10) Patent No.: US 9,046,269 B2
(45) Date of Patent: Jun. 2, 2015

(54) IMPINGEMENT COOLING DEVICE

(75) Inventors: Craig F. Smith, Ashford, CT (US); David A. Burns, West Hartford, CT (US)

(73) Assignee: PW Power Systems, Inc., Glastonbury, CT (US)

( * ) Notice: Subject to any disclaimer, the term of this patent is extended or adjusted under 35 U.S.C. 154(b) by 1965 days.

(21) Appl. No.: 12/167,284

(22) Filed: Jul. 3, 2008

(65) Prior Publication Data

US 2010/0000200 A1 Jan. 7, 2010

(51) Int. Cl.

| | |
|---|---|
| ***F02C 1/00*** | (2006.01) |
| ***F23R 3/00*** | (2006.01) |
| ***F01D 5/18*** | (2006.01) |
| ***F01D 9/02*** | (2006.01) |

(52) U.S. Cl.

CPC ................ *F23R 3/002* (2013.01); *F01D 5/186* (2013.01); *F01D 9/023* (2013.01); *F23R 2900/03044* (2013.01); *F05D 2260/201* (2013.01)

(58) Field of Classification Search

USPC ........... 60/752, 755, 756, 757, 758, 759, 760, 60/798, 800, 266, 804

See application file for complete search history.

(56) References Cited

U.S. PATENT DOCUMENTS

| | | | | |
|---|---|---|---|---|
| 4,301,657 | A | 11/1981 | Penny | |
| 4,875,339 | A * | 10/1989 | Rasmussen et al. | 60/757 |
| 5,297,385 | A * | 3/1994 | Dubell et al. | 60/804 |
| 6,079,199 | A | 6/2000 | McCaldon | |
| 6,435,816 | B1 | 8/2002 | Czachor | |
| 6,484,505 | B1 * | 11/2002 | Brown et al. | 60/760 |
| 6,494,044 | B1 | 12/2002 | Bland | |
| 6,546,731 | B2 | 4/2003 | Alkabie | |
| 6,701,714 | B2 | 3/2004 | Burd | |
| 6,769,257 | B2 | 8/2004 | Kondo | |
| 7,010,921 | B2 | 3/2006 | Intile | |
| 7,104,065 | B2 | 9/2006 | Benz | |
| 7,270,175 | B2 | 9/2007 | Mayer | |
| 7,827,801 | B2 | 11/2010 | Dawson | |
| 8,151,570 | B2 * | 4/2012 | Jennings et al. | 60/759 |
| 2008/0060360 | A1 | 3/2008 | Stastny | |

FOREIGN PATENT DOCUMENTS

| | | |
|---|---|---|
| GB | 836117 | 6/1960 |

OTHER PUBLICATIONS

Extended European Search Report, mailed Feb. 4, 2013, EP Application No. 09250927.2.

* cited by examiner

*Primary Examiner* — Ehud Gartenberg
*Assistant Examiner* — Arun Goyal
(74) *Attorney, Agent, or Firm* — Kinney & Lange, P.A.

(57) ABSTRACT

An impingement cooling sleeve includes a sleeve body having an inner surface to face a transition duct and an outer surface facing opposite the inner surface. At least one cooling hole is formed within the sleeve body and is used to direct cooling air toward the transition duct. At least one conduit member is attached to the sleeve body and is associated with the at least one cooling hole. The conduit member has a first opening to define an air inlet and a second opening to define an air outlet. In one example, the first opening is spaced apart from the outer surface of the sleeve body by a distance. In one example, the first opening comprises an annular end face surface that defines a plane that is obliquely orientated relative to the outer surface of the sleeve body.

19 Claims, 2 Drawing Sheets

IMPINGEMENT COOLING DEVICE

BACKGROUND OF THE INVENTION

This disclosure relates to an impingement cooling device for a gas turbine engine that increases cooling air flow to a transition duct.

Primary components of a gas turbine engine include a compressor section, a combustion section, and a turbine section. As known, air compressed in the compressor section is mixed with fuel and burned in the combustion section to produce hot gases that are expanded in the turbine section.

A combustor is positioned at a compressor discharge opening and is connected to the turbine section by transition ducts. The transition ducts are circumferentially spaced apart from each other in an annular pattern. Each transition duct is spaced from an adjacent transition duct by a small gap. The transition ducts conduct the hot gases from the combustor to a first stage inlet of the turbine section. A cooling impingement sleeve is positioned to surround each of the transition ducts. Each impingement sleeve includes a plurality of air holes that direct cooling air toward the heated transition ducts.

Air from the compressor section exits a diffuser via a discharge casing that surrounds the transition ducts. Some of this air is directed to cool the transition duct via the air holes in the impingement sleeve. The remaining air is eventually mixed with fuel in a combustion chamber.

Due to the tight packaging constraints between the various engine components, it may be difficult to direct a sufficient amount of cooling air to the transition duct. The compressor discharge air passing between the closely spaced transition ducts is accelerated through the gap between adjacent transition ducts, which results in a low local static pressure. This reduces the pressure drop that drives cooling air through the impingement sleeve, which can result in inadequate local cooling.

One proposed solution for increasing cooling air flow has been to weld scoops onto the impingement cooling sleeve. The scoops comprise semi-hemispherical members, i.e. a curved member that forms half of a hemisphere, that are welded to the impingement cooling sleeve at different air hole locations. These scoops have not been efficient in capturing and redirecting flow through impingement cooling holes.

Accordingly, there is a need to provide an impingement sleeve configuration with a more effective cooling structure.

SUMMARY OF THE INVENTION

An impingement cooling sleeve includes a sleeve body having an inner surface to face a transition duct and an outer surface facing opposite the inner surface. At least one cooling hole is formed within the sleeve body and is used to direct cooling air toward the transition duct. At least one conduit member is attached to the sleeve body and is associated with the cooling hole.

In one example, the conduit member has a first opening to define an air inlet and a second opening to define an air outlet, with the first opening being spaced apart from the outer surface of the sleeve body by a distance.

In one example, the first opening comprises an annular end face surface that defines a plane that is obliquely orientated relative to an outer surface of the sleeve body.

The conduit members of the invention provide a more effective cooling configuration that is less sensitive to variations in air flow direction.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
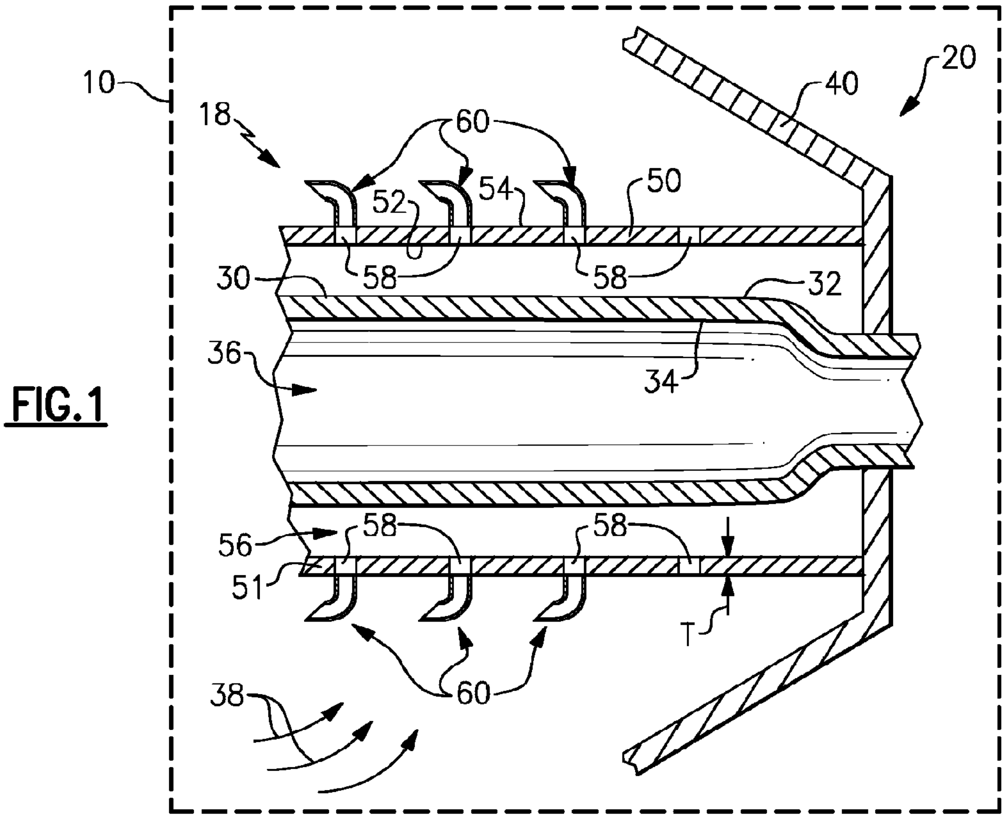
FIG. 1 is a schematic view of a cross-section of an impingement cooling sleeve and transition duct.
Figure 2:
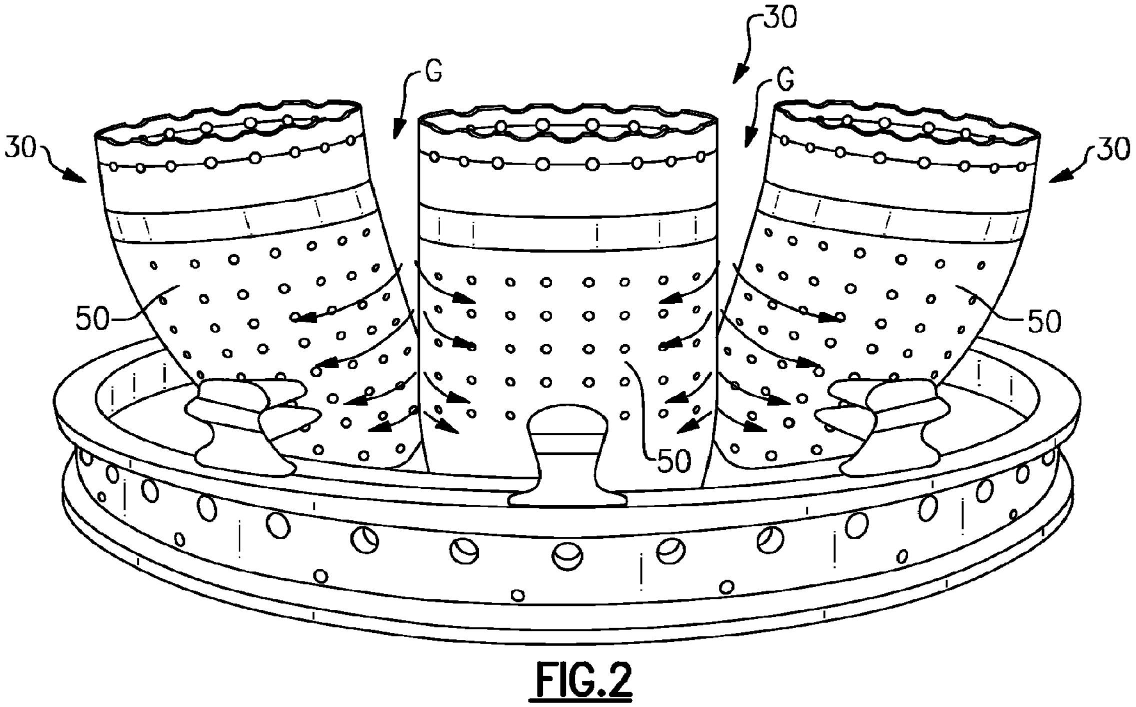
FIG. 2 is a perspective view of an engine with a plurality of impingement cooling sleeves.

FIG. 1 shows a transition duct 30 that connects a combustion section, indicated schematically at 18, to a turbine section indicated schematically at 20. The combustion 18 and turbine 20 sections are incorporated in a gas turbine engine 10 as known. The gas turbine engine 10 can be any type of engine and includes a plurality of transition ducts 30 as shown in FIG. 2. FIG. 1 shows an example of one transition duct, and it should be understood that the other transition ducts would be similarly configured.

As shown in FIG. 1, the transition duct 30 includes an outer surface 32 and an inner surface 34 that defines a passage 36 that carries the hot gases from an upstream combustor in the combustion section 18 to the turbine section 20. Air flow (as indicated by arrows 38) from a compressor section flows into a discharge casing 40 that surrounds the transition duct 30.

An impingement cooling sleeve 50 is positioned to surround each transition duct 30. The impingement cooling sleeve 50 includes a sleeve body 51 having an inner surface 52 that faces the outer surface 32 of the transition duct 30 and an outer surface 54 that faces the discharge casing 40. The inner surface 52 of the impingement cooling sleeve 50 is spaced circumferentially apart from the outer surface 32 of the transition duct 30 to define a chamber 56 around the transition duct 30. The impingement cooling sleeve 50 includes a plurality of cooling holes 58 that extend through a thickness T of the sleeve body of the impingement cooling sleeve 50 from the outer surface 54 to the inner surface 52.

Air flow indicated by arrows 38 passes from the discharge casing 40 into the chamber 56 via the cooling holes 58 to provide cooling air for the transition duct 30.

As shown in FIG. 2, the transition ducts 30 are spaced such that each transition duct is separated from an adjacent duct by a small gap G. Discharge air from the compressor section that passes between the closely spaced transition ducts is accelerated in the gaps G, which results in a low local static pressure. This reduces the pressure drop that drives cooling air flow through the impingement cooling sleeve 50.

Each impingement cooling sleeve 50 includes a plurality of conduit members 60 to direct an increased portion of the air flow 38 toward the transition duct 30 to provide increased cooling. Each conduit member 60 is associated with one of the cooling holes 58 in the impingement cooling sleeve 50. One conduit member 60 is not necessarily associated with every cooling hole; however, depending upon the application, conduit members could be associated with each cooling hole. In one example, the conduit members 60 are attached to the impingement cooling sleeve 50 in areas where there is low local static pressure. The conduit members 60 can be attached by welding or other attachment methods.

Figure 3:
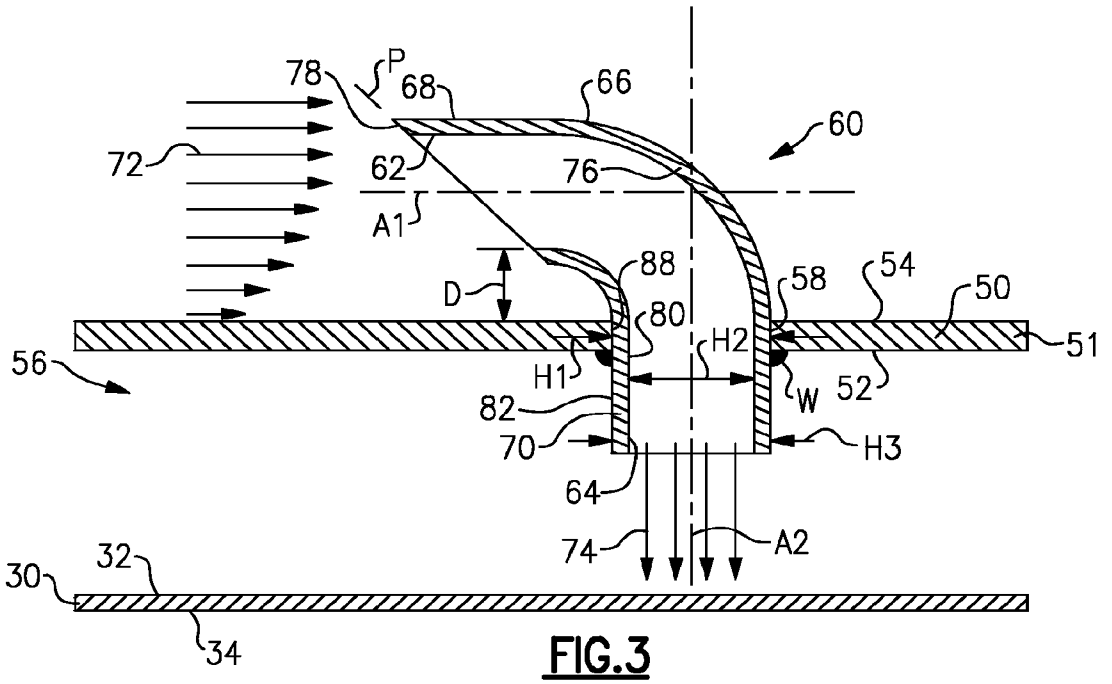
FIG. 3 is a schematic view of one example of an impingement cooling sleeve with a cooling conduit.

One example of a conduit member 60 is shown in FIG. 3. Each conduit member 60 has a first opening 62 to define an air inlet and a second opening 64 to define an air outlet. The first opening 62 is spaced apart from the outer surface 54 of the impingement cooling sleeve 50 by a distance D. Spacing the opening 62 a distance D from the outer surface 54 improves flow capture efficiency because the opening 62 is clear of a boundary layer that is formed immediately adjacent the outer surface 54. The distance D can be varied as needed depending upon the application and packaging constraints.

In the example of FIG. 3, the conduit member 60 comprises a tube 66 having a first portion 68 that provides the opening 62 for the air inlet and a second portion 70 that provides the opening 64 for the air outlet to the chamber 56. The first portion 68 extends along a first axis A1 and the second portion 70 extends along a second axis A2 that is non-parallel to the first axis A1. This configuration changes direction of air flowing in from one direction as indicated by arrows 72, to a different direction 74 such that cooling air is directed against the transition duct 30. This transition is provided by an elbow portion 76 that connects the first 68 and second 70 portions of the tube 66.

In one example, the first A1 and second A2 axes are perpendicular to each other. It should be understood that an angular relationship between the first A1 and second A2 axes could be varied as needed to provide increased flow.

The first opening 62 comprises an annular end face 78 that defines a plane P that is obliquely orientated relative to the outer surface 54 of the impingement cooling sleeve 50. The orientation of this annular end face 78 makes the conduit 60 less sensitive to variations in directions of air flow relative to the first axis A1. In other words, air that flows in a non-parallel direction relative to the first axis A1 will have a minimal effect on capture efficiency due to the oblique orientation of the first opening 62.

Each cooling hole 58 is defined by a cooling hole diameter H1. Each conduit 60 has an inner circumferential surface 80 defined by an inner diameter H2 and an outer circumferential surface 82 defined by an outer diameter H3. The conduit 60 is attached to the inner surface 52 of the sleeve 50 with a fillet weld W.

In the example shown in FIG. 3, the first portion 68 of the tube 66 is positioned on one side of the impingement cooling sleeve 50 and the second portion 70 of the tube 66 is positioned on an opposite side of the impingement cooling sleeve 50 such that the tube 66 extends entirely through the thickness T of the sleeve body. In this example, the outer circumferential surface 82 directly abuts an inner peripheral surface 88 of the cooling hole 58.

Figure 4:
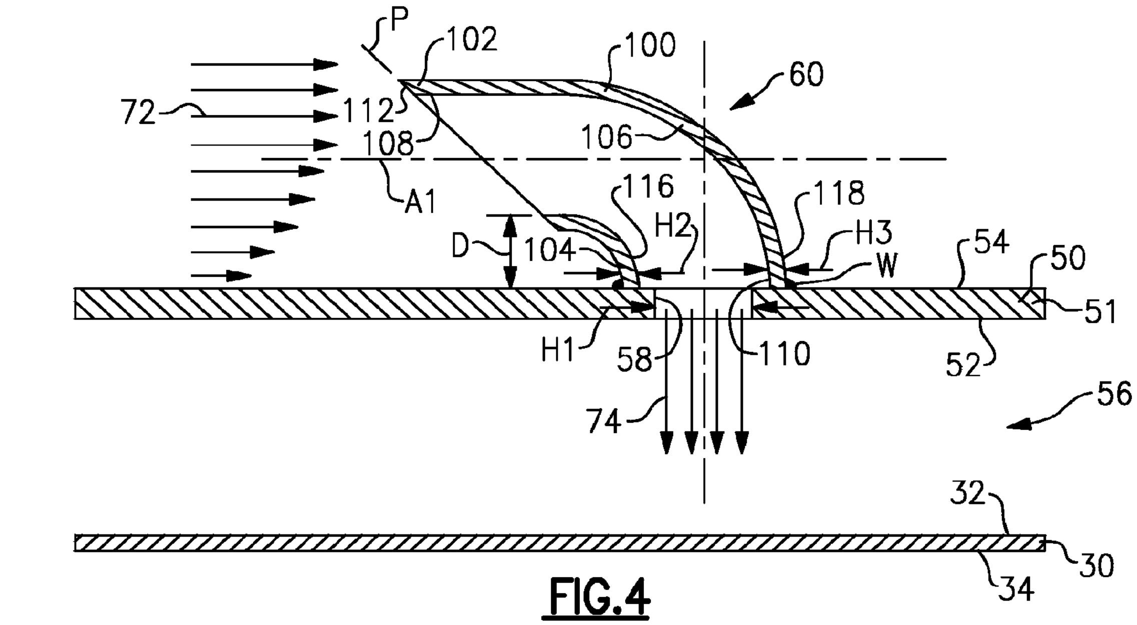
FIG. 4 is a schematic view of another example of an impingement cooling sleeve with a cooling conduit.

FIG. 4 another example of a conduit member 60. In this example, each conduit member 60 comprises a tube 100 with a first tube end 102 forming the air inlet and a second tube end 104 forming the air outlet. An elbow portion 106 transitions from the first tube end 102 to the second tube end 104 to change air flow direction as described above. Also in this example, first A1 and second A2 axes defined by the first 102 and second 104 tube ends are perpendicular to each other; however, it should be understood that an angular relationship between the first A1 and second A2 axes could be varied as needed to provide increased flow.

The first tube end 102 defines a first opening 108 for the air inlet and the second tube end 104 defines a second opening 110 for the air outlet. The first opening 108 is spaced apart from the outer surface 54 of the impingement cooling sleeve 50 by a distance D to improve flow capture efficiency as discussed above. The distance D can be varied as needed depending upon the application and packaging constraints.

Similar to the configuration set forth in FIG. 3, the first opening 108 comprises an annular end face surface 112 that defines a plane P that is obliquely orientated relative to the outer surface 54 of the impingement cooling sleeve 50. The orientation of this annular end face surface 112 makes the conduit member 60 less sensitive to variations in air flow direction relative to the first axis A1 as discussed above.

In the example shown in FIG. 4, the tube 100 has an inner circumferential surface 116 defined by an inner diameter H2 and an outer circumferential surface 118 defined by an outer diameter H3. The outer diameter H3 is greater than the cooling hole diameter H1. As such, the first 102 and second 104 tube ends of the tube 100 are positioned on the same side of the impingement cooling sleeve 50, and the second tube end 104 is directly attached to the outer surface 54 of the impingement cooling sleeve 50 with a weld W. This configuration makes the conduit members 60 even less sensitive to non-parallel flow.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An impingement cooling sleeve comprising:

a sleeve body having an inner surface to face a transition duct and an outer surface facing opposite said inner surface;

at least one cooling hole formed within said sleeve body to direct cooling air toward the transition duct; and at least one conduit member attached to said sleeve body and associated with said at least one cooling hole, and wherein said conduit member has a first opening to define an air inlet and a second opening to define an air outlet, said first opening being spaced apart from said outer surface of said sleeve body by a distance wherein said conduit member comprises a tube having a first portion with said air inlet extending along a first axis and a second portion with said air outlet extending along a second axis that is non-parallel to said first axis.

2. The impingement cooling sleeve according to claim 1 wherein said first and said second axes are perpendicular to each other.

3. The impingement cooling sleeve according to claim 1 wherein said first opening comprises an annular end face surface that defines a plane that is obliquely orientated relative to said outer surface of said sleeve body.

4. The impingement cooling sleeve according to claim 1 wherein said conduit member comprises a tube with a first tube end forming said air inlet and a second tube end forming said air outlet, and wherein said second tube end is directly attached to said outer surface of said sleeve body.

5. The impingement cooling sleeve according to claim 1 wherein said conduit member comprises a tube with a first tube end forming said air inlet and a second tube end forming said air outlet, and wherein said first tube end is positioned on one side of said sleeve body and said second tube end is positioned on an opposite side of said sleeve body such that said tube extends entirely through a thickness of said sleeve body defined from said outer surface to said inner surface.

6. The impingement cooling sleeve according to claim 1 wherein said cooling hole is defined by a cooling hole diameter, and wherein said conduit member comprises an inner circumferential surface defined by an inner diameter and an outer circumferential surface defined by an outer diameter, and wherein said outer diameter is at least as great as said cooling hole diameter.

7. The impingement cooling sleeve according to claim 6 wherein said outer circumferential surface directly abuts an inner peripheral surface of said cooling hole.

8. The impingement cooling sleeve according to claim 6 wherein said outer diameter is greater than said cooling hole diameter.

9. The impingement cooling sleeve according to claim 1 wherein said conduit member is welded to said sleeve body.

10. The impingement cooling sleeve according to claim 1 wherein said at least one cooling hole comprises a plurality of cooling holes and said at least one conduit member comprises a plurality of conduit members, and wherein each conduit member is associated with one cooling hole.

11. The impingement cooling sleeve according to claim 1 wherein said at least one conduit member is configured such that air exiting said at least one cooling hole flows solely through a single air path defined by said at least one conduit member.

12. The impingement cooling sleeve according to claim 1 wherein the transition duct carries gas from an upstream combustor in a combustion section in a downstream direction to a turbine section and wherein said first opening of said at least conduit member has a circumferentially outermost edge that is positioned upstream of a circumferentially innermost edge of said first opening.

13. An impingement cooling sleeve comprising:

a sleeve body having an inner surface to face a transition duct and an outer surface facing opposite said inner surface;

at least one cooling hole formed within said sleeve body to direct cooling air toward the transition duct; and at least one conduit member attached to said sleeve body and associated with said at least one cooling hole, and wherein said conduit member has a first opening to define an air inlet and a second opening to define an air outlet, wherein said first opening comprises an annular end face surface that defines a plane that is obliquely orientated relative to said outer surface of said sleeve body, and wherein said conduit member comprises a tube having a first portion with said air inlet extending along a first axis and a second portion with said air outlet extending along a second axis that is non-parallel to said first axis.

14. The impingement cooling sleeve according to claim 13 wherein said first opening is spaced apart from said outer surface of said sleeve body by a distance.

15. The impingement cooling sleeve according to claim 13 wherein said at least one cooling hole comprises a plurality of cooling holes and said at least one conduit member comprises a plurality of conduit members, and wherein each conduit member is associated with one cooling hole.

16. The impingement cooling sleeve according to claim 13 wherein said conduit member is welded to said sleeve body.

17. The impingement cooling sleeve according to claim 13 wherein said at least one conduit member is configured such that air exiting said at least one cooling hole flows solely out through a single air path defined by said at least one conduit member.

18. The impingement cooling sleeve according to claim 13 wherein the transition duct carries gas from an upstream combustor in a combustion section in a downstream direction to a turbine section, wherein said air inlet is defined by an inner opening edge and an outer opening edge spaced circumferentially outward relative to said inner opening edge, and wherein said inner opening edge is spaced apart from said outer surface of said sleeve body by a distance and wherein said outer opening edge is positioned upstream of said inner opening edge.

19. The impingement cooling sleeve according to claim 13 wherein the transition duct carries gas from an upstream combustor in a combustion section in a downstream direction to a turbine section and wherein said first opening of said at least conduit member has a circumferentially outermost edge that is positioned upstream of a circumferentially innermost edge of said first opening.

* * * * *